United States Patent [19]
Ricketts, Jr. et al.

[11] 3,753,243
[45] Aug. 14, 1973

[54] PROGRAMMABLE MACHINE CONTROLLER

[75] Inventors: Alan W. Ricketts, Jr., Derry, N.H.; Allan T. Devault; Russell C. Doane, both of Framingham, Mass.; John M. Dumser, Jr., Harvard, Mass.; John M. Holzer, Jr., Bogota, Colombia

[73] Assignee: Digital Equipment Corporation, Maynard, Mass.

[22] Filed: Apr. 20, 1972

[21] Appl. No.: 170,266

Related U.S. Application Data

[63] Continuation of Ser. No. 789,585, Jan. 7, 1969, abandoned.

[52] U.S. Cl. ............................................. 340/172.5
[51] Int. Cl. .......................................... G05b 11/00
[58] Field of Search ............................... 340/172.5; 235/151.1, 151.11

[56] References Cited
UNITED STATES PATENTS

| | | | |
|---|---|---|---|
| 3,275,988 | 9/1966 | Yetter | 340/172.5 |
| 3,345,611 | 10/1967 | Eachus | 340/172.5 |
| 3,391,392 | 7/1968 | Doyle | 340/172.5 |
| 3,400,374 | 9/1968 | Schumann | 340/172.5 |
| 3,403,386 | 9/1968 | Perkins et al. | 340/172.5 |
| 3,686,639 | 8/1972 | Fletcher et al. | 340/172.5 |
| 3,701,113 | 10/1972 | Chace et al. | 340/172.5 |
| 3,536,902 | 10/1970 | Cochran et al. | 340/172.5 X |
| 3,566,362 | 2/1971 | Taylor | 340/172.5 |
| 3,566,364 | 2/1971 | Huack | 340/172.5 |
| 3,573,445 | 4/1971 | Korytnaja et al. | 340/172.5 X |

FOREIGN PATENTS OR APPLICATIONS

1,126,891  9/1968  Great Britain

OTHER PUBLICATIONS

Bradley, Programmers Guide to the IBM/360, 1969, pp. 33–53 and pp. 90–99.
Lapidus, G., "Programmable Logic Controllers-Painless Programming to Replace the Relay Bank," in Control Engineering, April, 1971; pp. 49–60.

Primary Examiner—Paul J. Henon
Assistant Examiner—Melvin B. Chapnick
Attorney—Cesari and McKenna

[57] ABSTRACT

A controller for initiating and terminating the operations of a machine in response to the conditions of various sensors on the machine incorporates a data processor, which stores Boolean expressions governing the relationships between the sensor conditions and the machine operations. The processor sequentially compares the values of the individual independent variables of these expressions with the conditions of the corresponding sensors. Whenever a set of sensed conditions meets the criteria of one of the stored expressions, the processor emits a signal causing the machine to take the action governed by the expression.

25 Claims, 3 Drawing Figures

PROGRAMMABLE MACHINE CONTROLLER

This is a continuation of an application Ser. No. 789,585 filed Jan. 7, 1969 for a Control System now abandoned.

BACKGROUND OF THE INVENTION

1. Field of the Invention

This invention relates to the control of machine operations. More specifically, it relates to the automatic initiation and termination of the various operations performed by a machine tool that turns out a large number of like parts.

2. Prior Art

Prior to the present invention, two types of systems have generally been used for automatic electrical control of machine tools. One of these is the numerical control system in which the successive commands for the machining of a workpiece are recorded on punched tape or magnetic tape. A data processor decodes these commands and controls various machine operations to carry them out. This system is highly versatile and, indeed, is capable of imparting almost any desired form to a workpiece in response to the corresponding recorded program. For this reason it has largely replaced manual machine control in the machining of intricate workpieces, particularly where a small number of pieces are required.

Because of the relatively high cost of a numerical control system, another, less versatile arrangement is employed when a finished part is to be duplicated many times. Instead of the relatively expensive components used to accurately and continuously monitor the positions of the various elements in a numerically-controlled machine, this system makes use of a set of condition sensors such as limit switches that sense the arrival of various elements at their limits of travel during the various operations. The outputs of these switches operate a set of multiple contact relays whose contacts are wired according to the various logic functions governing the respective machine operations.

Specifically, various combinations of energized and de-energized relays correspond to given machine operations. Thus, each time a limit switch is actuated, thereby energizing or de-energizing a relay, the resulting new combination of energized and de-energized relays provides a new operation or set of operations.

The relay network employed in the latter system is much less expensive than its counterpart data processor used in the numerically-controlled systems. However, it is still fairly expensive. Whenever the design of the finished part is 3 substanially changed, this network is frequently discarded and an entirely new one wired into place. An object of the present invention is to provide an electrical machine control system that reduces this relatively high changeover cost.

Another object of the invention is to provide a machine control system that is highly reliable and therefore is characterized by relatively low maintenance costs.

A more general object is to provide a machine control system having a relatively low overall cost.

A further object of the invention is to provide a system that readily lends itself to rigorous testing and resulting modification of the logic arrangement prior to the actual wiring of the system.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

SUMMARY OF THE INVENTION

The present invention makes use of the fact that while initiation or termination of any given machine operation may depend on a complex Boolean governing function relating such action to the conditions of a number of condition sensors (e.g., limit switches), the governing function can always be compared with the respective sensor conditions sequentially, i.e., on a literal-by-literal or element-by-element basis, to determine whether or not the conditions as a whole satisfy the governing function. This sequential mode of operation can be used regardless of the form or complexity of the governing function. However, the principles involved will be more readily understood by considering a governing function that has been written in a "straight sequential" form, e.g., as a "sum of products":

$$a = (X_{1,1} \cdot X_{1,2} \cdot X_{1,3} \ldots X_{1,n_1}) + (X_{2,1} \cdot X_{2,2} \ldots X_{2,n_2}) + \ldots$$

(1)

or as a "product of sums":

$$b = (Y_{1,1} + Y_{1,2} + \ldots + Y_{1,m_1})(Y_{2,1} + \ldots + Y_{2,m}) \ldots$$

(1a)

where
- $X_{1,1}$, $X_{1,2}$, $Y_{1,1}$, $Y_{1,2}$, etc., represent the conditions (e.g., "on" or "off") of the respective sensors;
- $a$, $b$ represent the conditions (e.g., "on" or "off") of devices to be controlled in accordance with the governing functions; and
- $(\cdot)$ and $(+)$ represent the logical AND and OR operations, respectively.

In general, each of the literals or elements standing for an independent variable ($X_{1,1}, Y_{1,1}$, etc.) may represent either one of two possible output levels of a particular sensor. The sensors will ordinarily take the form of condition-responsive switches which are either closed or open. When closed or "on," a switch passes a finite output voltage to the machine controller; when open or "off," it has a zero-volt output.

Assume, for example, that each of the literals or elements in the functions (1) and (1a) represents the "on" condition of a sensor and that a device on a machine to be controlled is turned on if the corresponding governing function is satisfied by the conditions of the sensors. With the "sum of products" function (i.e., function 1), the function is satisfied if any one of its terms defined by a product of two or more elements is satisfied. Accordingly, the control system examines in turn the conditions of the sensors corresponding to the elements of the first term ($X_{1,1} \cdot X_{2,2} \ldots X_{1,n}$); and whenever a sensor is off, the system records that fact in a status register. At the end of the first term, the status register is inspected to see if any of the sensors that were examined were off. If none of them were off, i.e., all were on, the governing function has been satisfied at that point and the system can therefore take the action governed by the function.

On the other hand, if the governing function was not satisfied, i.e., the status register indicates that one or more of the examined sensors were off, the system proceeds to the second term of the governing function (1) and examines the conditions of the sensors corresponding to the elements in that term. Again, if none of these sensors are "off," as indicated by the condition of the status register after all of them have been examined, the system can take the action governed by the function. If the function is not satisfied, the system goes on to the elements in the next term of the governing function and so on until it reaches the end of the function.

Whenever an individual term in the governing function (1) has been satisfied, the system can skip the rest of the function, take the required action immediately, and then move on to the governing function controlling another device in the controlled machine. One embodiment of the invention operates in this fashion. Another version of the invention stores the fact that the governing function has been satisfied; the system then continues through the remaining terms of the function and takes the required action at the end thereof.

If one writes the governing function in the product of sums form (i.e., function 1a), the function will not be satisfied if any one of its factors or sums is not satisfied. The system is therefore programmed to proceed through each factor term-by-term. It records in the status register the occurrence of the "on" condition for any of the terms within the factor. At the end of each factor, the status register is inspected and if it indicates that none of the examined sensors was on, the governing function (1a) as a whole cannot be satisfied. The system can then take appropriate action. Depending on which version of the invention is employed, it can skip the remaining factors and move on to the governing function for another machine operation; or it can record the fact that the governing function will not be satisfied, proceed through the remaining terms of the governing function, and then avoid turning on the device controlled according to that function. Conversely, if at least one of the examined sensors was on, the system will proceed to the next factor in the governing function and examine the sensors corresponding to the terms in that factor.

All the governing functions for the various operations of the controlled machine are stored in a controller which also examines the conditions of the machine sensors, makes the decisions dictated by the sensor conditions and applies appropriate control signals to the various controllable elements of the machine. The controller organization is similar to that of a digital computer; in particular, it has a stored program. The governing functions are stored in the form of the individual instructions of this program, each of the elements being the subject of an individual instruction.

One type of instruction causes the controller to examine the condition of a particular sensor identified by the instruction and, depending on the corresponding value in the governing function, record either the value or the complement of the value of the sensor output. In response to another type of instruction, the controller imposes a given state on a controllable element in the machine, i.e., energizes or de-energizes the element, depending on whether or not the corresponding governing function has been satisfied.

In other words, each element representing an independent variable in the governing function is stored in a separate location in the memory in the form of an instruction to examine a specific sensor for a specific condition. The system retrieves these instructions from the memory individually and sequentially and thus examines the corresponding sensors one by one to determine whether or not the governing function is satisfied by the status function that represents the actual conditions of the machine sensors. When the status function meets the criteria defined by the governing function, the system takes the action governed by the latter function.

With present-day equipment, this step-by-step comparison can be accomplished so fast that the time involved is insignificant insofar as machine tool operation is concerned. Indeed, an electronic data processor can sequentially compare the terms of all governing functions for *all* machine operations with the corresponding terms of the status functions in an insignificant length of time. This is the arrangement we prefer to use, with the processor continuously cycling through all the governing functions.

The invention greatly reduces the amount of wiring required. There is no need to set up complex and inflexible decoding-encoding circuits such as used in the parallel comparison arrangement embodied in the relay matrices previously used or their solid state equivalents. Moreover, the system can be changed much more easily to accomplish a different set of machine operations. One need merely modify the governing functions stored in the processor by altering the instructions. There is no need to alter the connections from the machine sensors to the processor and from the processor to the various motors and actuators in the machine. This results in a very material cost saving each time a new part is to be produced by the controlled machine.

Preferably, the memory that stores the governing functions is a read-only memory in which the contents are determined by various fixed conducting paths within the memory. For example, in one well-known arrangement there is a set of transformer cores, each of which corresponds to one digit position in the words retrieved from the memory. Each memory "location" is a wire threaded through individual cores acccording to whether the respective digit positions of the word contained in that location have ONES or ZEROS. When the memory is addressed to retrieve a word stored therein, a pulse is applied to the corresponding wire and secondary windings on the cores through which the wire passes provide output voltages (or absences thereof) indicating ONES or ZEROS in the respective digit positions.

A wired memory is generally less expensive than a read-write memory, e.g., a magnetic core unit, yet it generally is significantly more reliable. Indeed, its overall cost is less even though the entire memory must be replaced when the governing function stored in the system is to be changed. Replacement is facilitated by the use of plugable units which permit the storage registers of a memory to be readily unplugged and a new one plugged in to replace it. The arrangement described below for manufacture of the memories further contributes to reliability and low cost.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENT

Figure 1:
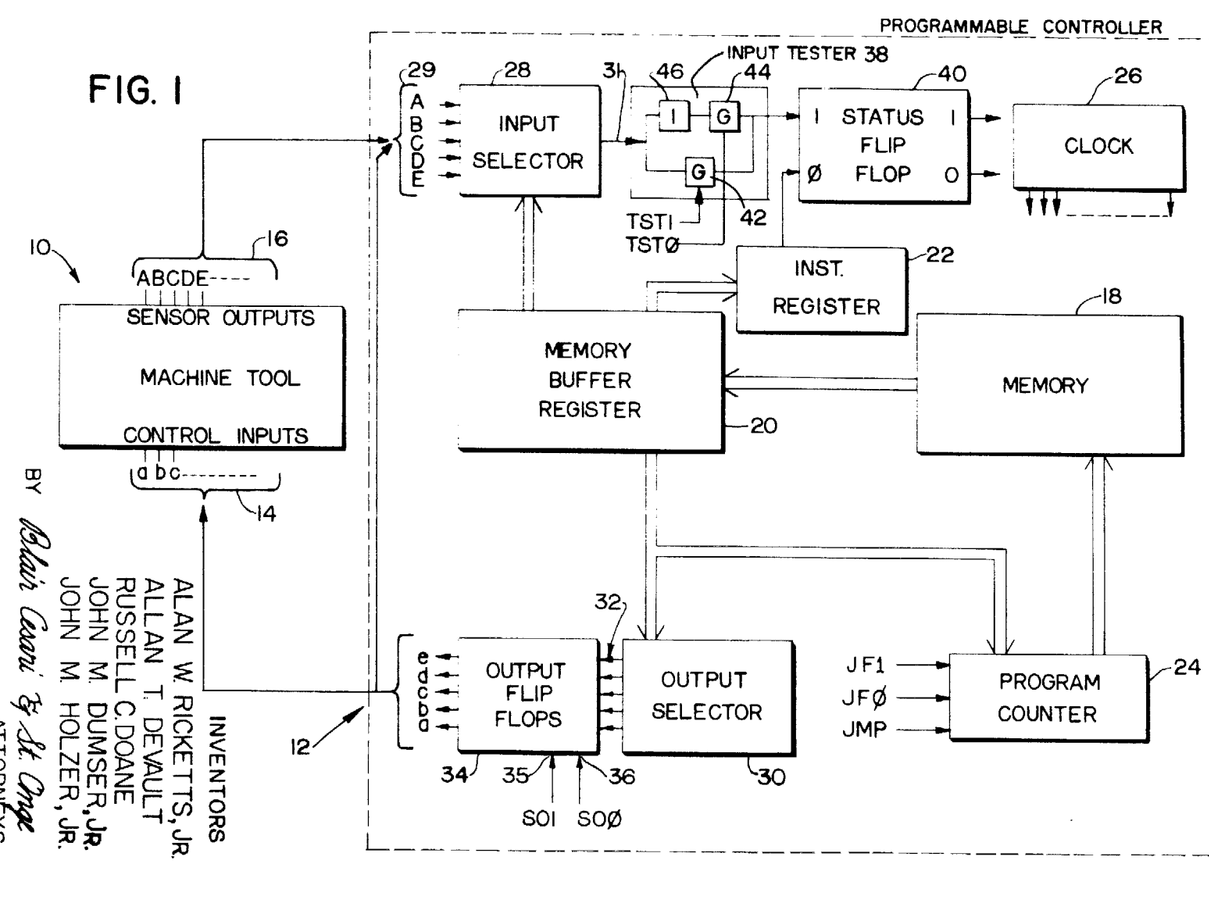
FIG. 1 is a diagram of a control system embodying the invention.
Figure 2:
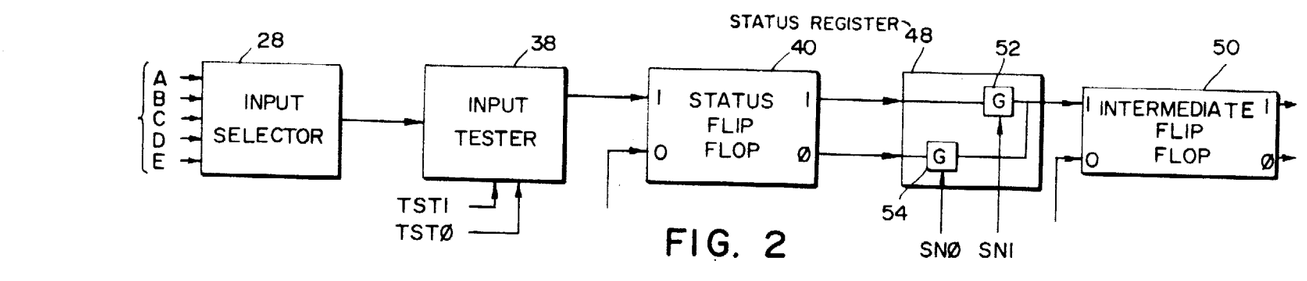
FIG. 2 is a fragmentary diagram of a second embodiment of the controller used in the system.

FIGS. 1 and 2 illustrate the two principal variations of the invention. The system of FIG. 1 can handle a Boolean governing function written in any arbitrary form with any number of variables and any arrangement of logical operations connecting variables or groups of variables. This versatility is obtained by means of certain jump instructions described in detail below.

More specifically, in the system of FIG. 1, a machine tool schematically shown at 10 is controlled by a programmable controller generally indicated at 12. In common with other electrically-controllable machine tools, the machine tool 10 has a set of identified control input terminals 14a, 14b, etc., which are energized to carry out the various machine operations. These operations include, for example, various linear and rotational movements of the workpiece being machined, the positioning, feeding and retracting of the tools that work on the workpiece, and the rotation of tool spindles. Voltages applied to the terminals 14 energize motors, clutches, and actuating solenoids to provide mechanical power for the respective machine operations.

The machine tool 10 also includes a set of sensors (not shown) that collectively indicate the status of the machine. In general, the machine status will be the collective quantized positions of the various movable elements in the machine, i.e., whether or not these elements have reached certain predetermined positions. An example of this is whether or not a boring tool has reached the end of its travel into the workpiece in the boring of a particular hole. The sensors generally take the form of switches located for actuation by the movable elements when they reach the predetermined positions. Thus, each sensor provides an "on" or "off" signal, e.g., voltage or no voltage, depending on whether or not it is being actuated by the movable element whose position it senses. The sensor outputs appear at a set of identified output terminals 16A, 16B, etc. The respective control inputs 14 are energized by the controller 12 according to the machine status as represented by the voltages appearing at the sensor output terminals 16.

The controller 12 has a basic organization similar to that of a conventional digital computer. It includes a memory 18 and a memory buffer register 20 to which the contents of the respective addresses in the memory 18 are transferred. There is an instruction register 22 that receives instructions transferred from the memory 18 to the register 20 and decodes these instructions to control the various operations of the controller. A program counter 24, which doubles as a memory address register, contains the address of the location in the memory 18 whose contents are to be transferred to the memory buffer register 20.

The timing of the various controller operations is governed by a clock 26. In this connection we note that for the sake of clarity, only information paths and control inputs have been shown in the drawing. The gating accomplished in conjunction with the output signals from the clock 26 has generally been omitted. It will be understood that this aspect of the system can be identical with that of a conventional digital computer.

The controller 12 also includes an input selector 28 with input terminals 29 and an output selector 30 and, again, these elements operate in the same manner as their counterparts in conventional computers that receive inputs from a variety of sources and apply outputs to a number of different devices. Thus, in response to an identifying number contained in the memory buffer register 20, the input selector 28 gates the signal at a selected one of its input terminals 29 to a single output terminal 31. Conversely, the output selector 30 responds to an identifying number in the register 20 by energizing a single one of its output terminals 32 and thereby enabling a single flip-flop in a set of flip-flops 34 to receive a signal at a terminal 35 or 36. Flip-flop output terminals 34a, 34b, etc., are connected to the corresponding machine tool control input terminals 14 and thus the flip-flops 34 provide the control signals for the machine tool 10.

The output of the input selector 28 is applied to an input tester 38 whose output in turn is applied to the ONE input terminal of a status flip-flop 40. In some cases an input terminal is to be tested to see if its signal is "on." To accomplish this, a gate 42 is enabled by a TST1 signal decoded from a TST1 instruction transferred to the register 22 to pass the selector 28 output signal to the ONE input terminal of the flip-flop 40. This will set the flip-flop 40, i.e., impose the ONE state on it, if the selected input signal is "on." If the input signal is "off," the state of the flip-flop will remain unchanged.

Conversely, when a selected input terminal 29 is to be tested to see if its signal is "off," a gate 44 is enabled by a TST0 signal to pass the output of an inverter 46 connected to the selector output terminal 31. If the selected signal is "off," the flip-flop 40 will be set; if the signal is "on," the status of the flip-flop will remain unchanged.

Thus, the flip-flop 40 stores the status of the respective inputs received from the machine tool sensors. As described below, the controller 12 inspects the condition of the flip-flop 40 to determine when the various output flip-flops 34 should be set or reset, to energize or de-energize the corresponding machine tool input terminals 14.

As an example, the basic controller illustrated in FIG. 1 is capable of executing seven different instructions. Accordingly, the first several bits of the word stored in each memory location identify an instruction; the remainder of the word is an address field containing bits that identify a memory address, a selected input terminal 29 or a selected output terminal 35. The instruction set is as follows:

TST1 – set the flip-flop 40 if, and only if, the input terminal 29 identified by the number in the address field is "on";

TST0 — set the flip-flop 40 if, and only if, the input terminal 29 identified by the number in the address field is "off";

JF1 — jump to the address in the address field if, and only if, the status flip-flop 40 is in the ONE state; this and other jump instructions are accomplished by transferring the new address from the register 20 to the program counter 24; whenever a jump is performed under this instruction, the status flip-flop 40 is reset (i.e., the ZERO state is imposed on it);

JF0 — jump to the address in the address field if, and only if, the status flip-flop 40 is in the ZERO state (i.e., not set); clear (i.e., reset) flip-flop 40 unconditionally;

JMP — jump (unconditionally) to the address in the address field;

SO1 — set the output flip-flop 34 identified in the address field;

SO0 — clear (i.e., reset) the output flip-flop 34 identified in the address field.

Several examples will serve to illustrate operation of the controller 12. In each case the flip-flop 40 is initially in the ZERO state. This state ias automatically imposed on the flip-flop when the controller is initially turned on; after that the flip-flop 40 is reset by each JF1 or JF0 instruction in any sequence in which it has been set. Thus, the system always enters a governing function sequence with the flip-flop in the ZERO state.

EXAMPLE I

First, assume that the machine tool input terminal 14c is to be energized if either the sensor terminal 16A or 16B is "on." This may be expressed in Boolean form, as $$A + B = c \qquad (2)$$

The memory 18 will contain the following instruction sequence in location N and successive locations:

| Location | Instruction |
|---|---|
| 1. N | TST1 (A) — if A on, set flip-flop 40 |
| 2. N+1 | TST1 (B) — if B on, set flip-flop 40 |
| 3. N+2 | JF0 (N+5) — if flip-flop 40 is not set, jump to location N+5 |
| 4. N+3 | SO1 (c) — turn on flip-flop 34 to energize control terminal 14(c) |
| 5. N+4 | JMP (N+6) — jump to location N+6 |
| 6. N+5 | SO0 (c) — turn off flip-flop 34 to deenergize control terminal 14 (c) |
| 7. N+6 | Beginning of operation governed by next governing function. |

In accordance with the formula (2), the first two instructions cause the controller to set the flip-flop 40 if either the sensor terminal 16A or 16B is "on." If either one is "on," nothing happens under the next instruction (3) which calls for a jump if the flip-flop has not been set. During the following memory cycle (4), the terminal 14c is energized in response to the set condition of the flip-flop 40 and, in response to the succeeding instruction (5), the controller jumps to the location N+6 to begin operation in accordance with the next governing function.

If neither of the test input terminals is "on," the controller will impose the "off" condition on the machine tool input terminal 14c. Specifically, the flip-flop 40 will not be set after the second instruction, and accordingly, under the third instruction, the controller will respond to the cleared condition of this flip-flop by jumping over the next two instructions to location N+5; this location contains an instruction de-energizing the terminal by clearing the corresponding flip-flop 34. The program counter then indexes in normal sequence to the location N+6 for operation governed by the next governing function.

EXAMPLE II

Next, assume an operation governed by a logical AND relationship between two inputs. For example, the control terminal 14c is to be energized if both the sensor terminals 16A and 16B are "on". The governing function is thus $$c = A \cdot B \qquad (3)$$

By use of DeMorgan's theorem, formula (2) can be converted to the equivalent $$\bar{c} = \bar{A} + \bar{B} \qquad (4)$$

The following instruction sequence will provide machine control according to this expression:

| Location | Instruction | |
|---|---|---|
| 1. N | TST0 | (A) |
| 2. N+1 | TST0 | (B) |
| 3. N+2 | JF1 | (N+5) |
| 4. N+3 | SO1 | (c) |
| 5. N+4 | JMP | (N+6) |
| 6. N+5 | SO0 | (c) |
| 7. N+6 | begining of operation according to next governing function | |

As one might expect, this is the inverse of the operation governed by the OR formula (2). Under the first two instructions, the flip-flop 40 is set if either the terminal 16A or 16B is "off." If either of the terminals is off, the control terminal 16c should not be energized. Accordingly, the third instruction will cause the controller to jump to location N+5 which contains the instruction (6) to turn off the terminal 14c.

On the other hand, if both the terminals 16A and 16B are "on," the flip-flop 40 will not be set during the course of the first two instructions, and there will be no jump in response to the third instruction. The system will thus perform the next instruction (4), thereby turning on the flip-flop 34 that energizes the terminal 14c. In response to the following instruction, the controller will jump over the location N+5 to enter the first instruction of the next governing function.

EXAMPLE III

Another logical operation is a logical NOR, e.g., "if neither terminal 16A nor 16B is 'on', energize control terminal 14c. " In Boolean form this may be expressed as $$\overline{A + B} = c \qquad (5)$$

The following instruction sequence may be used for this operation:

| Location | Instruction | |
|---|---|---|
| 1. N | TST1 | (A) |
| 2. N+1 | TST1 | (B) |
| 3. N+2 | JF1 | (N+5) |
| 4. N+3 | SO1 | (c) |
| 5. N+4 | JMP | (N+6) |
| 6. N+5 | SO0 | (c) |
| 7. N+6 | First instruction under next governing expression. | |

EXAMPLE IV

Next, assume an exclusive OR relationship, for example, "if sensor terminal 16A or 16B is 'on', but both are not 'on', energize control terminal 14c."

In Boolean form, this may be expressed as $$A \cdot \bar{B} + \bar{A} \cdot B = c \quad (6)$$

The following instruction sequence will accomplish this operation:

| Location | Instruction | |
|---|---|---|
| 1. N | TST0 | (A) |
| 2. N+1 | TST1 | (B) |
| 3. N+2 | JF0 | (N+8) |
| 4. N+3 | TST1 | (A) |
| 5. N+4 | TST0 | (B) |
| 6. N+5 | JF0 | (N+8) |
| 7. N+6 | SO0 | (c) |
| 8. N+7 | JMP | (N+9) |
| 9. N+8 | SO1 | (c) |
| 10. N+9 | Beginning of operation according to next governing function. | |

Example IV illustrates the main purpose of the conditional jump instructions (JF1, JF0). Assume, for example, that the sensor terminal 16A is on and the terminal 16B is off. The sensor conditions will thus satisfy the first term of the governing function (6) and because they satisfy the first term, they satisfy the function as a whole. Accordingly, when the controller 12 reaches the third instruction, the flip-flop 40 will be in the ZERO state and the conditional jump JF0 in that instruction will turn on the corresponding output flip-flop 34 (instruction 9).

Consider what would happen if there were no conditional jump instruction (3) and the controller were merely to continue on to the next two test instructions. With the postulated conditions of the terminals 16A and 16B, the flip-flop 40 would be set as a result of these instructions, indicating that the snesor conditions did not satisfy the second term of the governing function. Therefore, if the controller were to decide at that point whether or not the governing function had been satisfied, it would, in response to the condition of the flip-flop 40, impose the "off" condition, rather than the "on" condition, on the controlled device. This problem is eliminated by jumping over the second term of the governing function when the first term has been satisfied.

The conditional jump at instruction (6) serves a second purpose, namely, the avoidance of instruction (7), which calls for the system to de-energize the controlled device if the conditions for energizing it have not been satisfied. In this connection we note that in all of the examples we have used governing functions that completely define the output of the controller 12. That is, after proceeding through a governing function, the controller imposes either the "on" or "off" state on the controlled device in the machine tool 10. The controller 12 can be programmed with separate governing functions for turning the controlled devices on and off. However, it generally conserves memory capacity (and operating time) to combine the two functions into a single, composite governing function for both the "turn on" and "turn off" operations of the controller.

The foregoing examples illustrate relatively simple logical functions, all of which are in the "straight sequential" form. The controller 12 of FIG. 1 is equally capable of handling complex functions with its sequential mode of operation, as illustrated by the following example:

EXAMPLE V

Assume the following governing function:

$$(A \cdot B \cdot C + D \cdot \bar{E}) \cdot F + G + H = c \quad (7)$$

The controller 12 can be programmed with the following instruction sequence to operate according to this function:

| Location | Instruction | |
|---|---|---|
| 1. N | TST0 | (A) |
| 2. N+1 | TST0 | (B) |
| 3. N+2 | TST0 | (C) |
| 4. N+3 | JF0 | (N+7) [A,B,C on] |
| 5. N+4 | TST0 | (D) |
| 6. N+5 | TST1 | (E) |
| 7. N+6 | JF1 | (N+10) [first element not true] |
| 8. N+7 | TST0 | (F) |
| 9. N+8 | JF1 | (+10) [first element and F not true] |
| 10. N+9 | JMP | (N+15) |
| 11. N+10 | TST1 | (G) |
| 12. N+11 | TST1 | (H) |
| 13. N+12 | JF1 | (N+15) |
| 14. N+13 | SO0 | (c) |
| 15. N+14 | JMP | (N+16) |
| 16. N+15 | SO1 | (c) |
| 17. N+16 | Beginning of operation according to next governing function | |

Example V illustrates the manner in which the conditional jump instructions enable the system to handle Boolean expressions having any arbitrary form. The first element of the governing function (7), i.e. the portion within the parentheses, is the sum of two products. The conditional jump instruction (4) therefore serves the same purpose as in Example IV by skipping over the second term of this sum if the first term is satisfied. In this case, however, it jumps to the end of the sum to the literal (F) (instruction (8)). This literal is a factor of a product whose other factor is the first element of the governing function.

On the other hand, if the first term $(A \cdot B \cdot C)$ is not satisfied, the controller passes through the conditional jump at instruction (4) and makes the tests corresponding to the product $(D \cdot \bar{E})$. If the corresponding sensor conditions do not satisfy this term either, the entire product cannot be satisfied and the controller therefore executes a conditional jump at instruction (7) to the location (N+10) for a test of the term (G).

In other words, if either of the two terms of the first element in the governing function (7) is satisfied by the conditions of corresponding sensors, the system then tests the condition of the sensor corresponding to (F) (instruction (8)). If the condition of this sensor does not satisfy this test, the product $(A \cdot B \cdot C + D \cdot \bar{E}) \cdot F$ is not satisfied and therefore the system jumps (instruction (9)) to location (N+10) for a test of the sensor corresponding to (G).

Thus, the quantity $(A \cdot B \cdot C + C \cdot D)$ may be considered as a single variable (P) which forms a product $(P \cdot F)$ with the variable (F). This product is treated in the same manner as a product in the product of sums expression (1a): if the conditions of the sensors corresponding to factor (P) do not satisfy the prescribed tests, the entire product cannot be satisfied and the system should therefore jump over the factor (F) to the end of the product. In this case, since there are other terms in the function, i.e., (G and H), whose corresponding tests might indicate satisfaction of the governing function, the jump instruction moves the controller to those tests.

Moreover, the product $(A \cdot B \cdot C + D \cdot \overline{E}) \cdot F$ may be considered as a product $(P \cdot F)$ in a "sum of products" expression $(P \cdot F + G + H)$ and therefore satisfaction of the product $(P \cdot F)$ is tantamount to satisfaction of the entire governing function. Accordingly, if after the test corresponding to the literal $(F)$ the product $(P \cdot F)$ is satisfied, a jump instruction (10) moves the controller to the end of the governing function.

The remaining jump instructions (13 and 15) in Example V are for the purpose of providing both the "turn on" and "turn off" operations of the controller (12).

Thus, while certain of the jump instructions used with a complex governing function jump to intermediate points in the function rather than all the way to the end, they serve essentially the same purpose as the conditional jump instructions in "straight sequential" governing functions which do jump to the end of the function. These portions of the governing function may be considered as subfunctions, in that when the tests corresponding to a portion of a subfunction indicate either that the subfunction as a whole has been satisfied or cannot be satisfied, the remaining portions of the subfunction are skipped. The purpose accomplished by this is the same as set forth above in the discussion of the jump instructions in Example IV.

The memory 18, which will ordinarily be a fixed or "read-only" memory, stores all of the governing functions for the machine tool 10. The system can then continuously cycle through all the governing functions in turn and take whatever action may be dictated by the comparisons of the respective functions with the corresponding status functions of machine tool 10. The internal speed of the controller 12 is so much greater than the speeds of the various mechanical and electromechanical elements of the machine tool 10 that, insofar as the machine tool is concerned, the commands to the machine tool are transmitted essentially instantaneously after the occurrence of the sensor conditions upon which the commands are predicated, even with the controller 12 repetitively stepping through all of the governing functions.

It should be understood that the sensors in the machine tool 10 are not limited to simple switches. Other devices capable of providing two-state outputs will serve as well. Thus, a conventional position transducer having a continuously-variable output can be connected to a quantizer that provides a signal indicating whether the sensed position is greater or less than a predetermined value. The controller 12 can sense these conditions the same way it senses the on and off conditions of limit switches. In similar fashion, any other continuously-variable parameter can be quantized electrically to provide a two-level signal that is processed by the system in the manner described above.

In some cases, one of the considerations in a decision on whether to turn on or off (i.e., energize or de-energize) a controllable element in the machine 10 is the state of that element or some other controllable element, i.e., whether the element is presently on or off. To facilitate determinations of this nature, the output terminals 34a, etc., of the flip-flops 34 are connected to certain input terminals 29 of the input selector 28. Thus, some of the terminals 29 are connected to the machine tool 10 and the remainder are connected to the output terminals 34a, etc.

With this arrangement, the condition of any flip-flop 34 can be sensed by means of a TST1 or TST0 instruction having the appropriate identification number in the address field. It will be observed that for this purpose the flip-flops 34 serve as additional condition sensors for the machine tool 10.

Alternatively, one might use separate instructions for sensing the conditions of the flip-flops 34. These instructions would be TSTO1 — set the flip-flop 40 if and only if the flip-flp 34 identified in the address field is on; and TSTO0 — set the flip-flop 40 if and only if the flip-flop 34 identified in the address field is off.

FIG. 2 depicts an arrangement that does not require jump instructions. In this version, the Boolean governing function must be in a "straight sequential" form, i.e., either sum of products or product of sums. However, this is not an impasse to universal applicability, since all Boolean expressions may be reduced to a "straight sequential" form. The controller is arranged to operate in a correspondingly "straight sequential" fashion in which it executes all instructions in each sequence.

As pointed out above, the system of FIG. 1 requires jump instructions, even when the governing function is in a "straight sequential" form, in order to avoid countermanding a correct decision made before all the factors or terms of the condition function of the machine tool have been examined. The system of FIG. 2 takes care of this problem by means of an intermediate flip-flop which it sets whenever, at any point, the preceding tests indicate that a governing function has been satisfied or cannot be satisfied. This flip-flop is examined after all the terms in the governing function have been compared with the corresponding terms of the status function. The flip-flop will be in the ONE state at that time if any of the governing terms has been satisfied. In that case, the system takes the action specified by the governing function.

More specifically, as shown in FIG. 2, the output of the status flip-flop 40 is applied to a status tester 48, whose output in turn sets an intermediate flip-flop 50. The tester 48 includes a gate 52 that is enabled by an SN1 command to pass the signal at the ONE output terminal of the flip-flop 40 to the flip-flop 50 and thereby set the flip-flop 50 if the flip-flop 40 is in the ONE state. Similarly, a gate 54 is enabled by an SN0 signal so as to set the flip-flop 50 if the status flip-flop 40 is in the ZERO state.

The system of FIG. 2 has the following instruction set:

TST1 — Same as for FIG. 1;

TST0 — Same as for FIG. 1;

SN1 — Set the intermediate flip-flop 50 if, and only if, the status flip-flop 40 is in the ONE state; then reset the flip-flop 40;

SN0 — Set the intermediate flip-flop 50 if, and only if, the status flip-flop 40 is in the ZERO state; then reset the flip-flop 40;

SON — Set the output flip-flop 34 identified in the address field to the state of the intermediate flip-flop 50; then reset the intermediate flip-flop 50;

SONC — Set the output flip-flop 34 identified in the address field to the complement of the state of the intermediate flip-flop 50; then reset the intermediate flip-flop 50.

The following examples illustrate the operation of a system having the foregoing instruction set:

EXAMPLE VI

Assume a governing function having the form $$A \cdot B + C \cdot D = c \quad (8)$$

The following instructions will control the machine tool 10 according to this function:

| Memory Location | Instruction |
|---|---|
| 1. N | TST0 (A) |
| 2. N+1 | TST0 (B) |
| 3. N+2 | SN0 |
| 4. N+3 | TST0 (C) |
| 5. N+4 | TST0 (D) |
| 6. N+5 | SN0 |
| 7. N+6 | SON (c) |

EXAMPLE VII

Assume a governing function having the form $$\overline{A \cdot B} + \overline{C \cdot D} = c \quad (9)$$

The following instructions will control the machine tool 10 according to this function:

| Memory Location | Instruction |
|---|---|
| 1. N | TST1 (A) |
| 2. N+1 | TST0 (B) |
| 2. N+2 | SN0 |
| 4. N+3 | TST0 (C) |
| 5. N+4 | TST0 (D) |
| 6. N+5 | SN1 |
| 7. N+6 | SONC (c) |

EXAMPLE VIII

This example illustrates operation in accordance with a governing function having the product of sums form:

$$(A+B)(C+D) = c \quad (10)$$

| Location | Instruction |
|---|---|
| 1. N | TST1 (A) |
| 2. N+1 | TST1 (B) |
| 3. N+2 | SN0 |
| 4. N+3 | TST1 (C) |
| 5. N+4 | TST1 (D) |
| 6. N+5 | SN0 |
| 7. N+6 | SONC (c) |

With the arrangement of FIG. 2, the setting of intermediate flip-flop 50 is analogous to the conditional jump instructions in the system of FIG. 1. That is, the controller inspects the flip-flop 40 at the end of each term of the governing function when the form of expression (1) is used, and at the end of each factor when the governing function is in the form of expression (1a). This determines whether or not the intermediate flip-flop 50 is to be set at that time.

Thus, access to the memory 18 is strictly sequential, the controller goes to each memory location in turn, i.e., in a fixed sequence, regardless of the governing functions being implemented and regardless of the results of comparisons previously made. This uniform sequential pattern allows the use of a memory requiring logic of reduced complexity. Also, a "self-addressing" drum or disk memory can be used.

Figure 3:
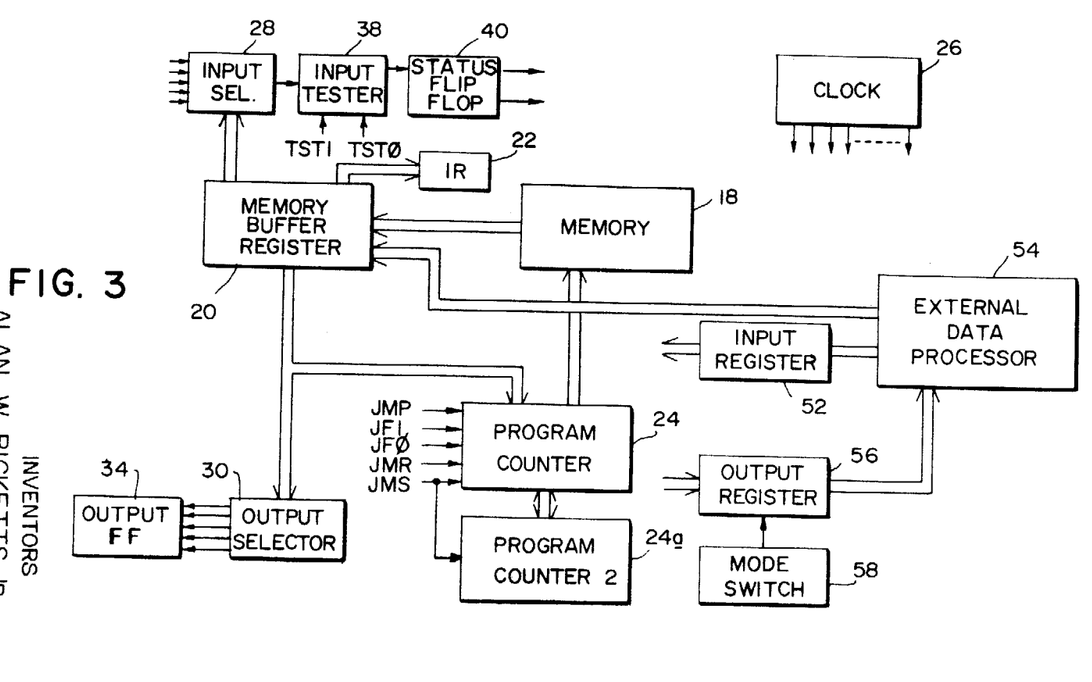
FIG. 3 is a diagram of a third version of the controller.

FIG. 3 illustrates a further version of the invention containing several additional features. The first of these is an arrangement for the use of subroutines common to several governing functions. When the program calls for a subroutine, the system jumps to the first memory location of the subroutine and then indexes through the remaining memory locations thereof. When the subroutine is completed, the system must return to the point of departure from the original instruction sequence, and since the memory 18 is a fixed memory, this address is stored in an additional register.

Specifically, a register 24a is connected for transfer of memory addresses with the program counter 24. (Control of the instruction sequence is in any case retained in the program counter.) The controller is arranged to carry out the following instructions in connection with these transfers:

JMS — Index the program counter 24 and then transfer the contents thereof to the register 24a; then jump to the address in the address field of the word in the memory buffer 20. This shifts the program to the first address of a subroutine after first storing in the register 24a the next memory location in the original instruction sequence.

JMR — Transfer contents of register 24a to program counter 24. This is the last instruction in the subroutine; it returns the program to the point of departure from the main instruction sequence.

In many cases, it will be desirable for the controller 12 to communicate with, and operate in conjunction with, an external device such as a general purpose data processor. For example, when a program for the controller is first devised, it may be desirable to test it before embodying it in a fixed memory for the controller.

For this purpose, we have devised an arrangement in which a proposed program for the controller 12 is first stored in the magnetic core memory of a conventional data processor. The instructions are then transferred one-by-one to the memory buffer 20 of the controller 12 and the controller then uses them as though they had been retrieved from the controller's own memory 18. If the program requires any modification, this can easily be accomplished in the memory of the external processor. Finally, when a satisfactory program has been worked out and tested, it can be transferred from the external processor to punched cards or punched tape, etc. The latter can then be used to control a machine that layes down the wire in a wired memory of the type described above. This makes for an economical and reliable method of providing the memories for the controllers.

Also, in case of malfunction an external data processor can be provided with a diagnostic program that enables the processor to inspect the contents of the various controller registers and effect transfers between these registers to detect the causes of the malfunctions.

Accordingly, we have included in the system of FIG. 3 an input register 52 connected to transfer data from an external data processor 54 to other registers in the controller 12, and an output register 56 for transfer of data in the opposite direction, i.e., from the controller 12 to the processor 54. Additionally, the system includes a mode switch 58 which in one position provides for operation of the controller 12 in an internal mode, i.e., in accordance with the contents of the memory 18 in the manner described above. In its other position the switch 58 provides an external mode by substituting the data processor 54 for the memory 18, so that the memory buffer register 20 receives instructions from the data processor 54. In this external mode of operation, indexing of the program counter 24 may be interrupted so that when the controller 12 returns to the internal mode, it picks up where it left off from its internal instruction sequence.

In addition to the instructions in the instruction set for the controller 12 of FIG. 1, the system of FIG. 3 includes the following:

TRR — transfer contents of the register identified by last three bits in the address field to the register identified by the second last three bits in the address field.

The system may also include other instructions common to conventional digital data processors, e.g. *halt, clear all outputs*, etc.

It will be apparent that the system of FIG. 3 can be provided with the flexibility of a general-purpose data processor by operating it in the external mode when required for trouble-shooting or program development and testing. Yet, it has the low cost of a fixed-memory special purpose processor when operating in the internal mode to provide the machine-controlling function for which it is designed. A single general-purpose data processor can service a large number of controllers, so that even the cost of this device is relatively low when amortized among the individual controllers. The arrangement of FIG. 3 is also well-suited to the use of an internal diagnostic program which, by means of the plug-in arrangement described above, can be substituted for the machine-controlling program ordinarily used in the controller.

It should be understood that while the system of FIG. 3 has been described specifically as a modification of the system of FIG. 1, the principles involved are also applicable to the FIG. 2 version of the invention.

Thus, we have described a novel control system that turns on and off various operating elements of a device in response to the conditions of various sensors. The system does this by storing the various governing functions for the controlled devices and comparing the governing functions with the condition functions representing the sensor conditions in serial form, i.e., element-by-element. Even though many such comparisons are made in sequence, the system accomplishes them so fast that all of them can be made in an insignificant time insofar as the operation of the controlled device is concerned.

The basically simple, uncomplicated structure of the controller is another important feature. As compared with most digital computers, it has relatively few elements, particularly in the arrangements shown in FIGS. 1 and 2. This, coupled with the small instruction set and the fixed memory, makes for a low overall cost, together with high reliability. The latter attribute is of particular importance in machine tool applications where lost time can be expensive.

It will be apparent that in addition to the arrangements described above in detail, other configurations will operate in accordance with the invention. In particular, other instruction sets may be used to accomplish the serial comparisons on which the invention is based.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

What we claim as new and desire to secure by Letters Patent of the United States is:

1. In a control system of the type including (i) a machine having a plurality of addressed condition sensors and a plurality of addressed controllable devices to be energized and de-energized and (ii) a controller arranged to energize and de-energize said controllable devices according to governing functions, each defining a set of sensor conditions to thereby relate the operations of said devices to the outputs of said sensors, the improvement in which said controller includes
   A. means for storing governing functions in a form permitting retrieval of said functions element-by-element,
   B. means for periodically sequentially comparing the values in each governing function represented by the respective elements standing for independent variables with the corresponding values of the sensor outputs to which the governing function relates, and
   C. means for energizing or de-energizing said controllable devices in response to the comparisons between the governing functions and related sensor conditions.

2. The system defined in claim 1 in which said comparing means is arranged to cyclically compare in turn the values in all of said governing functions with the corresponding condition sensor outputs.

3. The system defined in claim 1 in which
   A. each element standing for an independent variable corresponds to a condition of a particular sensor,
   B. each sensor provides a two-level output, and
   C. each of said elements represents one of the two output levels of the corresponding sensor.

4. The system defined in claim 3 wherein said comparing means includes
   A. a status register, and
   B. means responsive to each comparison between a governing function value and the output of its corresponding sensor to impose a given state on said status register if the sensor output has a given level.

5. The system defined in claim 4 wherein at least one governing function comprises a plurality of subfunctions and wherein
   A. said comparing means includes means for inspecting said status register at times when the state thereof might determine whether the sensor outputs satisfy a governing function or subfunction, and
   B. said storing means includes means responsive to the state of said status register at said times for
      1. causing said comparing means to skip remaining elements in said governing function or subfunction when the state of said status register determines that the governing function or subfunction has been or cannot be satisfied by the sensor outputs.

6. The system defined in claim 5 arranged to remove said given state from said status register whenever said inspecting means inspects it.

7. The system defined in claim 4 wherein at least one governing function comprises a plurality of subfunctions,
   A. said comparing means includes i. an intermediate register, and ii. means for inspecting said status register at times when the state thereof indicates whether a governing function or subfunction has been satisfied or cannot be satisfied by the corresponding sensor outputs and imposing a given state on said intermediate register depending on the condition of said status register at such times, and B. said energizing and de-energizing means are responsive to the condition of said intermediate register after all said comparisons between the values in the governing function and the corresponding sensor outputs have been made.

8. The system defined in claim 1 wherein

A. said storing means comprises a digital memory, each of said independent variable values being part of an input word in a unique memory location, the input word also identifying the sensor corresponding to that value, and B. said comparing means includes means responsive to each input word in sequence to select the sensor identified therein and compare the condition of said sensor with the independent variable value contained in said word and thereby provide each of the sequential comparisons.

9. The system defined in claim 8 wherein

A. each value of a dependent variable representing an action to be taken in response to a governing function is part of an output word in a unique memory location, the output word also identifying a controllable device corresponding to the dependent variable, and B. said means for energizing or de-energizing the controllable device being active when the output word is retrieved from the memory depending on whether the governing function has been satisfied.

10. In a control system of the type including (i) a machine having condition sensors and controllable devices to be energized and de-energized and (ii) a controller arranged to energize and de-energize said controllable devices according to governing functions relating the operations of said devices to the outputs of said sensors, the improvement in which said controller includes A. a digital memory for storing governing functions in a form which separate elements thereof correspond to words in separate memory locations, B. a memory access register, C. means for loading said access register with a succession of words stored in said memory, D. a status register, E. means responsive to sensor words from said memory contained in said access register to 1. select sensors identified by said words, said means for each such sensor word imposing a given state on said status register depending on whether the condition of the selected sensor meets a criterion therefor contained in said word, F. output means responsive to one or more output words from said memory successively contained in said access register to change the state of a controllable device identified by one of said output words, depending on the condition of said status register.

11. The system defined in claim 10 including means responsive to conditional jump words in said access register for jumping over selected memory addresses depending on the correspondence between the state of said status register and a criterion therefor contained in each of said conditional jump words.

12. The system defined in claim 10 in which said output means includes

A. an intermediate register,

B. means responsive to certain words in said access register for imposing a given state on said intermediate register depending on the correspondence between the state of said status register and criteria contained in said certain words, and C. means responsive to certain further words in said access register to change the states of controllable devices identified in such words depending on the condition of said intermediate register.

13. A controller for use with a plurality of addressed condition sensors and a plurality of addressed controllable devices to be energized and de-energized, said controller being arranged to energize and de-energize the controllable devices according to governing functions, each governing function defining a set of sensor conditions to thereby relate the operations of the devices to the outputs of the sensors, said controller including A. means for storing governing functions in a form permitting retrieval of the functions element-by-element, B. means for periodically sequentially comparing the values in each governing function represented by the respective elements standing for independent variables with the corresponding values of the sensor outputs to which the governing function relates, and C. means for energizing or de-energizing the controllable devices in response to the comparisons between the governing functions and related sensor conditions.

14. A controller defined in claim 13 in which said comparing means is arranged to cyclically compare in turn the values in all of said governing functions with the corresponding condition function values.

15. A controller defined in claim 13 wherein said comparison means includes

A. 2 status register, and

B. means responsive to each comparison between a governing function value and the output of its corresponding sensor to impose a given state on said status register if the sensor output has a given level.

16. A controller defined in claim 15 wherein at least one governing function comprises a plurality of subfunctions and wherein A. said comparing means includes means for inspecting said status register at times when the state thereof might determine whether the sensor outputs satisfy a governing function or subfunction, and B. said storing means includes means responsive to the state of said status register at said times for 1. causing said comparing means to skip remaining elements in said governing function or subfunction when the state of said status register determines that the governing function or subfunction has been or cannot be satisfied by the sensor outputs.

17. A controller defined in claim 16 arranged to remove said given state from said status register whenever said inspecting means inspects it.

18. A controller defined in claim 13 wherein at least one governing function comprises a plurality of subfunctions,
   A. said comparing means including
      i. an intermediate register, and
      ii. means for inspecting said status register at times when the state thereof indicates whether a governing function or a subfunction has been satisfied or cannot be satisfied by the corresponding sensor outputs and imposing a given state on said intermediate register depending on the condition of said status register at such times, and
   B. said energizing and de-energizing means being responsive to the condition of said intermediate register after all said comparisons between the values in the governing function and the corresponding sensor outputs have been made.

19. A controller defined in claim 13 wherein
   A. said storing means comprises a digital memory, each of said independent variable values being part of an input word in a unique memory location, the input word als identifying the sensor corresponding to that value, and
   B. said comparing means includes means responsive to each input word in sequence to select the sensor identified therein and compare the condition of said sensor with the independent variable value contained in said word and thereby provide each of the sequential comparisons.

20. A controller defined in claim 19 wherein
   A. each value of a dependent variable representing an action to be taken in response to a governing function is part of an output word in a unique memory location, the output word also identifying a controllable device, and
   B. said means for energizing or de-energizing the controllable device being active when the output word is retrieved from the memory depending on whether the governing function has been satisfied.

21. A controller for use with a plurality of condition sensors and a plurality of controllable devices to be energized and de-energized, said controller arranged to energize and de-energize the controllable devices according to governing functions relating to the operations of the devices to the outputs of the sensors, said controller including
   A. a digital memory for storing governing functions in a form in which separate elements thereof correspond to words in separate memory locations,
   B. a memory access register,
   C. means for loading said access register with a succession of sensor and output words stored in said memory,
   D. a status register,
   E. means responsive to a sensor word from said memory contained in said access register for imposing a a given state on said status register depending on whether the condition of a selected sensor meets a criterion therefor contained in the sensor word in said access register, each sensor word identifying the sensor to be selected, and F. output means responsive to output words from said memory in said access register for changing the state of a selected controllable device depending on the condition of said status register, each output word identifying the controllable device to be selected.

22. The controller defined in claim 21 including means responsive to conditional jump words in said access register for jumping over selected memory addresses depending on the correspondence between the state of said status register and a criterion therefor contained in each of said conditional jump words.

23. The controller defined in claim 21 wherein said output means additionally includes
   A. an intermediate register, and
   B. means responsive to certain words in said access register for imposing a given state on said intermediate register depending on the correspondence between the state of said status register and criteria contained in said certain words, said output means being responsive to certain further words in said access register for changing the states of controllable devices identified in such words depending on the condition of said intermediate register.

24. In a control system of the type including (i) a device having a plurality of addressed condition sensors and a plurality of addressed controllable devices to be energized and de-energized and (ii) a controller arranged to energize and de-energize said controllable devices according to governing functions, each defining a set of sensor conditions to thereby relate the operations of said devices to the outputs of said sensors, the improvement in which said controller includes
   A. means for storing governing functions in a form permitting retrieval of the functions element-by-element,
   B. means for sequentially comparing the values in each governing function represented by the respective elements standing for independent variables with the corresponding values of the sensor outputs to which the governing function relates, said comparing means being iteratively operable during each control system operation, and
   C. means for energizing or de-energizing said controllable devices in response to the comparisons between said governing functions and related sensor conditions.

25. A controller for use with a machine having a plurality of addressed condition sensors and a plurality of addressed controllable devices to be energized and de-energized in a cycle of operations, said controller arranged to energize and de-energize the controllable devices according to governing functions, each governing function defining a set of sensor conditions to thereby relate the operations of the controllable devices to the outputs of the sensors, said controller including
   A. means for storing governing functions in a form permitting retrieval of the functions element-by-element,
   B. means for sequentially comparing the values in each governing function represented by the respective elements standing for independent variables with the corresponding values of the sensor outputs to which the governing function relates, said comparing means being iteratively operable during each machine operating cycle for comparing all governing functions, and
   C. means for energizing or de-energizing the controllable devices in response to the comparisons between the governing functions and related sensor conditions.

* * * * *